United States Patent [19]

Hasegawa et al.

[11] Patent Number: 4,725,726
[45] Date of Patent: Feb. 16, 1988

[54] OPTICAL COORDINATE INPUT DEVICE HAVING WAVEFORM SHAPING CIRCUIT

[75] Inventors: Kazuo Hasegawa; Junichi Ouchi; Hiroaki Sasaki, all of Furukawa; Takanori Miura, Miyagi, all of Japan

[73] Assignee: Alps Electric Co., Ltd., Japan

[21] Appl. No.: 881,192

[22] Filed: Jul. 2, 1986

[30] Foreign Application Priority Data

Jul. 9, 1985 [JP] Japan ................................ 60-151913
Jul. 12, 1985 [JP] Japan ................................ 60-153647
Jul. 12, 1985 [JP] Japan ................................ 60-153648

[51] Int. Cl.⁴ ..................... G01V 9/04; G06M 7/00
[52] U.S. Cl. ................................. 250/221; 340/556
[58] Field of Search ...................... 250/221, 222.1; 340/555, 556

[56] References Cited

U.S. PATENT DOCUMENTS

| | | | |
|---|---|---|---|
| 3,704,396 | 11/1972 | Macdonald | 250/221 |
| 3,742,222 | 6/1973 | Endl | 250/221 |
| 3,764,813 | 10/1973 | Clement et al. | 250/221 |
| 3,775,560 | 11/1973 | Ebeling et al. | 250/221 |
| 3,825,745 | 7/1974 | Thomson | 340/556 |
| 3,970,846 | 7/1976 | Schofield, Jr. et al. | 250/221 |
| 4,247,767 | 1/1981 | O'Brien et al. | 250/222.1 |
| 4,313,109 | 1/1982 | Funk et al. | 250/221 |
| 4,652,741 | 3/1987 | Golborne | 250/222.1 |

Primary Examiner—David C. Nelms
Assistant Examiner—William L. Oen
Attorney, Agent, or Firm—Guy W. Shoup

[57] ABSTRACT

An optical coordinate input device comprises a plurality of light emitting elements arranged so that their optical axes intersect mutually, a plurality of light receiving elements arranged so as to receive the light signals of the light emitting elements, a drive circuit for turning on/off the light emitting elements on the basis of a drive signal to cause them to provide the light signals, a first switching circuit for switching the output given from the drive circuit to among the light emitting elements, a second switching circuit for switching the signals given from the light receiving elements in correspondence with the light emitting element lighting, and a waveform shaping circuit for regulating the signal given from the second switching circuit to a certain voltage level on the basis of the drive signal.

Since the waveform shaping circuit exerts its regulation action on the basis of the drive signal, the present optical coordinate input device can provide reliably the coordinate signal even if operated at a high speed without depending upon the precision of optical elements and without being influenced by disturbance light, switching noises, and the like.

10 Claims, 12 Drawing Figures

OPTICAL COORDINATE INPUT DEVICE HAVING WAVEFORM SHAPING CIRCUIT

BACKGROUND OF THE INVENTION

1. Field of the Invention

This invention relates to an optical coordinate input device for detecting position information selected and, more particularly, to an improvement of its detection performance.

2. Description of the Prior Art

In general, the optical coordinate input device is disposed in front of a picture screen, for example, of a CRT display and functions in such a manner that as a light signal is intercepted by selecting a desired position by means of a finger, for example, in correspondence with the information displayed on the screen, information concerning that position can be provided. The optical coordinate input device of the above type is in demand increasingly in the field of input devices, for example, personal computers. Further, the optical coordinate input device of this type is degraded little mechanically because a coordinate is detected by means of the light signal; thus, its capability as an input device is expected to increase greatly in the future.

However, the optical coordinate input device of the above type is composed of a number of light emitting and light receiving elements, so that variations in the elements influence largely its optical conversion characteristic. In addition, the light receiving element is susceptible to disturbance light such as the sunlight, thereby simply resulting in malfunctions. Accordingly, it is strongly desired that the optical coordinate input device should not cause malfunctions even under such circumstances as above.

An example of the conventional optical coordinate input device will now be described with reference to FIGS. 11 and 12. FIG. 11 is a circuit configuration diagram of the conventional optical coordinate input device, and FIG. 12 is a waveform diagram of signals at portions of a waveform shaping circuit shown in FIG. 11.

In FIG. 11, reference numeral 1 indicates a drive circuit, 3 is an amplifier circuit, 4 is a waveform shaping circuit, 5 is a CPU, 6 and 7 are first and second switching circuits.

The drive circuit 1 operates on the basis of a drive signal a given from the CPU 5 which is a microprocessor. Into the base of a transistor $Q_3$ of the drive circuit 1 the drive signal a is input, to its collector a supply voltage is applied from a power terminal Vcc, and to its emitter the first switching circuit 6 is connected which supplies a current to light emitting diodes $L_1$-$L_n$ functioning as the light emitting elements.

Switching elements $SL_1$-$SL_n$ of the first switching circuit 6 are switched successively on the basis of a switching signal b given from the CPU 5 so that only one circuit is closed at a time, starting from the switching element $SL_1$. To one ends of these switching elements $SL_1$-$SL_n$ the emitter of the transistor $Q_3$ is connected, and to the other ends the anodes of the light emitting diodes $L_1$-$L_n$ are connected respectively.

The cathodes of the light emitting diodes $L_1$-$L_n$ are grounded. Among the light emitting diodes $L_1$-$L_n$ one light emitting diode selected by the switching signal b is rendered conductive by the drive circuit 1 so as to emit light a given number of times, and these light emitting diodes $L_1$-$L_n$ provide light pulses successively in this order. They are arranged in two straight lines so that the optical axes of the light emitting diodes $L_1$-$L_m$ intersect orthogonally those of the light emitting diodes $L_{(m+1)}$-$L_n$.

Phototransistors $PT_1$-$PT_m$ and $PT_{(m+1)}$-$PT_n$ functioning as the light receiving elements for receiving the light pulse signals given from the light emitting diodes $L_1$-$L_n$ are arranged straight opposite to the light emitting diodes $L_1$-$L_m$ and $L_{(m+1)}$-$L_n$, respectively. The emitters of the phototransistors $PT_1$-$PT_n$ are grounded, and their collectors are connected to one-side terminals of the corresponding switching elements $S_1$-$S_n$ of the second switching circuit 7. The other-side terminals of the switching elements $S_1$-$S_n$ are connected to a condenser $C_1$ and resistor $R_4$ of the waveform shaping circuit 4 so that the supply voltage is applied thereto from the power terminal Vcc through resistors $R_1$ and $R_4$. These switching elements $S_1$-$S_n$ close one circuit at a time successively, starting from the switching element $S_1$ on the basis of the switching signal b supplied from the CPU 5. The switching action of the second switching circuit 7 is identical in timing to the switching signal b applied to the first switching circuit 6, so that the light emitting diodes $L_1$-$L_n$ and corresponding, opposed phototransistors $PT_1$-$PT_n$ are concurrently put into operation.

When the phototransistors $PT_1$-$PT_n$ receive the light signals given from the light emitting diodes $L_1$-$L_n$, they increase or decrease their currents on the basis of that light signals and by the action of the resistors $R_1$ and $R_4$, such a pulse voltage waveform as indicated by $V_{PT}$ in FIG. 12 is generated.

This pulse voltage waveform $V_{PT}$ is applied through the the coupling condenser $C_1$ to the base of the transistor $Q_1$ in the form of a pulse voltage waveform like that indicated by $V_B$ in FIG. 12. To the base of the transistor $Q_1$ a d.c. bias voltage is also applied through a resistor $R_5$ from the power terminal Vcc; thus, the pulse voltage waveform $V_B$ takes the composed voltage value of the base-emitter forward Zener voltage $V_{BE}$ ($V_{BE} \approx +0.6$ V) of the transistor $Q_1$ caused by the d.c. bias voltage and of the pulse voltage applied through $C_1$ from the switching circuit 7. As the pulse voltage waveform $V_B$ is applied to the base of the transistor $Q_1$ and only when it takes a value exceeding the base-emitter forward Zener voltage $V_{BE}$, a base current like that indicated by $I_B$ in FIG. 12 flows. On the basis of the waveform of this base current $I_B$ a collector current flows in the circuit connected from the power terminal Vcc to the collector of the transistor $Q_1$ through the resistors $R_1$ and $R_2$, and a signal of voltage fluctuation caused by a change of the above current is provided to the amplifier circuit 3. To cut away a pulse fluctuation of the voltage at the point where the resistors $R_1$, $R_2$, and $R_4$ are connected together, a condenser $C_2$ is connected to that point for bypassing the pulse voltage fluctuation.

Then, on the basis of the output signal of the waveform shaping circuit 4 given through the amplifier circuit 3, the CPU 5 provides a coordinate signal corresponding to the state of light signals received by the phototransistors $PT_1$-$PT_m$ and $PT_{(m+1)}$-$PT_n$. This output represents the position of the phototransistors which do not receive the light signals due to their interception by the finger, for example, so that the position information on the screen can be obtained therefrom.

However, the conventional optical coordinate input device of the foregoing configuration has the following problems:

Because the pulse voltage waveform $V_{PT}$ is generated by switching a number of light emitting and light receiving elements having variations in photoelectric conversion characteristics by the use of the first and second switching circuits 6 and 7, and because these light emitting and light receiving elements are disposed in front of a picture display device and configured so as to be easily susceptible to sunlight or disturbance light of non-uniform strength given from other lighting equipment and the like, the pulse voltage waveform $V_{PT}$ obtained from each light receiving element varies largely from element to element, and such a variation tends to fall outside the variation-absorbable range of a clamp circuit for absorbing variations which utilizes the condenser $C_1$ and the base-emitter forward Zener voltage characteristic $V_{BE}$ of the transistor $Q_1$.

In addition, malfunctions occur in detecting coordinates due to switching noises arising upon switchover of the elements.

According to the prior art, in order to prevent occurrence of malfunctions, an optical filter are attached in front of the light emitting and light receiving elements so as to reduce an influence of disturbance light; but, on the other hand, this optical filter lowered the photoelectric conversion efficiency of the light emitting and light receiving elements, thus degrading the light detector performance.

To reduce such a baneful influence, it was required to select and use light emitting and light receiving elements of a superior photoelectric conversion efficiency; thus, the optical coordinate input device needing a number of such elements could not be inexpensively mass-produced.

In addition, the light emitting and light receiving elements, such as phototransistors $PT_1-PT_n$ and LEDs for providing the light signal, have variations in their light characteristic. Further, the phototransistors $PT_1-PT_n$ are influenced by a change in strength of light, for example, of the CRT display or disturbance light. As a result, the collector voltage $V_{PT}$ of each phototransistor varies. Therefore, as indicated by $V_{PT}$ in FIG. 12, if the collector voltage $V_{PT}$ of the transistor $PT_2$ lowers remarkably due to disturbance light and the like when that phototransistor $PT_2$ has received the light signal, the base voltage $V_B$ of the transistor $Q_1$ also lowers as indicated by $V_B$ in FIG. 12; thus, the transistor $Q_1$ tends to be kept in the OFF state during the scanning period of the phototransistor $PT_2$. If it happens, as indicated by $I_B$ in FIG. 12, the coordinate signal is indicated as being in a blocked state; thus, despite the fact that the phototransistor $PT_2$ has received the light signal, the personal computer or the like decides erroneously that the coordinate has been entered. On the other hand, because the voltage is applied through the resistor $R_5$ to the base of the transistor $Q_1$, a charging current Ic flows into the coupling condenser $C_1$ as shown in FIG. 11. Therefore, when the collector voltage $V_{PT}$ of the phototransistor lowers, as indicated by $PT_2$ or $PT_{(n-1)}$ of $V_B$ in FIG. 12, the falling level of the base voltage $V_B$ of the transistor $Q_1$ is raised. However, because the base voltage $V_B$ rises simply gradually in accordance with the time constant of the resistor $R_5$ and coupling condenser $C_1$, when the collector voltage $V_{PT}$ of the phototransistor lowers remarkably, the coordinate signal keeps its high state as described hereinabove. Then, if, for example, as indicated by $V_{PT}$ in FIG. 12, the light signal is received at the moment the collector voltage $V_{PT}$ of the phototransistor $PT_3$ has risen a little, the base current $I_B$ of a small level tends to flow into the transistor $Q_1$ or distortion tends to appear in the base current $I_B$ curing its rising period (see the waveform of $I_B$ in FIG. 12); thus, it becomes difficult to judge whether or not the coordinate signal provided implies a pulse waveform. Therefore, in this case also, there is the fear that the personal computer or the like registers an erroneous detection.

Further, at the time the switches $S_1-S_n$ of the switching circuit 7 have been switched over by the use of a synchronization pulse, due to switching noises the collector voltage $V_{PT}$ each of the phototransistors $PT_1-PT_n$ falls momentarily, and the base voltage $V_B$ of the transistor $Q_1$ also falls momentarily. As a result, at the time of switchover of the switches $S_1-S_n$, the base current $I_B$ of the transistor $Q_1$ falls or is cut off momentarily, and the noise signal is added to the coordinate signal. Accordingly, there is the fear that the personal computer or the like decides this noise signal be the coordinate signal, and the foregoing becomes a cause of erroneous detection.

As described hereinabove, the base-emitter junction of the transistor $Q_1$ functions as the diode and forms the clamp circuit in conjunction with the coupling condenser $C_1$ and resistor $R_5$, and thus performs compensation through its clamp action so as to make the base voltage $V_B$ assume uniformly a given level when that voltage $V_B$ lowers. However, if the base voltage $V_B$ changes, as described above, due to variations in the optical characteristic of the light emitting and light receiving elements and/or an influence of disturbance light and switching noises, the base voltage $V_B$ cannot be compensated for up to a given level even by the clamp action.

By setting the resistance of the resistor $R_5$ to be small the clamp action can achieve an enhanced extent of compensation; but, with a small resistance of the resistor $R_5$, the amount of excess storage carriers accumulated within the base of the transistor $Q_1$ increases and the impedance on the base side of the transistor $Q_1$ lowers. Therefore, with respect to the falling and rising of the collector voltage $V_{PT}$ of the phototransistor, the falling and rising of the base voltage $V_B$ of the transistor $Q_1$ lag, and the waveform of the base voltage $V_B$ is distorted. Accordingly, in case the light emitting and light receiving elements are scanned at a high speed, this also becomes a cause of erroneous detection.

SUMMARY OF THE INVENTION

It is a first object of the present invention to provide an optical coordinate input device whose performance does not depend upon the precision of light emitting and light receiving elements and whose malfunctions can be prevented from occurring even if subjected to intense disturbance light, such as sunlight or flashlight of a camera.

It is a second object of the present invention to provide an optical coordinate input device capable of sending out accurately a coordinate signal without being influenced by disturbance light, switching noises, and the like.

It is a third object of the present invention to provide an optical coordinate input device capable of sending out accurately a coordinate signal even if operated at a high speed, without being influenced by disturbance light, switching noises, and the like.

To achieve the foregoing objects, an optical coordinate input device according to the present invention comprises a plurality of light emitting elements $L_1$-$L_n$ arranged so that their optical axes intersect mutually, a plurality of light receiving elements $PT_1$-$PT_n$ arranged so as to receive the light signals of the light emitting elements $L_1$-$L_n$, a drive circuit 1 for turning on/off the light emitting elements $L_1$-$L_n$ on the basis of a drive signal a to cause them to provide the light signals, a first switching circuit 6 for switching the output given from the drive circuit 1 successively to the light emitting elements $L_1$-$L_n$, a second switching circuit 7 for switching the signals given from the light receiving elements $PT_1$-$PT_n$ in correspondence with the light emitting element, $L_1$-$L_n$, and a waveform shaping circuit 2 for regulating the signal given from the second switching circuit 7 to a certain voltage value on the basis of the drive signal a.

An optical coordinate input device according to another feature of the present invention comprises a light receiving element array arranged opposite to a light emitting element array for receiving the light signal given from each light emitting element to provide a coordinate signal, a switching circuit for switching and connecting the light receiving element array in correspondence with scanning of the light emitting elements, a bipolar transistor whose base is connected through the switching circuit to each light receiving element for amplifying and providing the coordinate signal, and a coupling condenser for coupling the switching circuit with the base of the bipolar transistor, and is characterized by switching means being closed at the time of switchover of the switching circuit for applying a given voltage to the base of the bipolar transistor, and clamp means for fixing the coordinate signal to be applied to the base of the bipolar transistor to a given level.

An optical coordinate input device according to still another feature of the present invention comprises a light receiving element array arranged opposite to a light emitting element array for receiving the light signal given from each light emitting element to provide a coordinate signal, a switching circuit for switching and connecting the light receiving element array in correspondence with scanning of the light emitting elements, a bipolar transistor whose base is connected through the switching circuit to each light receiving element for amplifying and providing the coordinate signal, and a coupling condenser for coupling the switching circuit with the base of the bipolar transistor, and is characterized by switching means being closed at the time of switchover of the switching circuit for applying a given voltage to the base of the bipolar transistor, clamp means for fixing the coordinate signal to be applied to the base of the bipolar transistor to a given level, and adjusting means for adjusting the base current of the bipolar transistor.

The foregoing technical means or components function as follows:

The light pulse signals provided from the light emitting diodes $L_1$-$L_n$ are detected by the corresponding light signal receiving phototransistors $PT_1$-$PT_n$ and applied through the second switching circuit 7 to the waveform shaping circuit 2. From the signal provided from the second switching circuit 7 waveforms due to switching noises and disturbance light during the quiescent period of the light pulse signal are deleted on the basis of the drive signal a, and its peak value during the entry of the light signal is regulated to a certain level of voltage by means of the waveform shaping circuit 2. Then, the output signal of the waveform shaping circuit 2 is supplied through an amplifier circuit 3 to a CPU 5 and converted thereby accurately into a coordinate signal.

In the latter features of the present invention, to the base of the bipolar transistor for amplifying and providing the coordinate signal a given voltage is applied at the time of switchover of the switching circuit by the switching means, and the level of the coordinate signal to be applied to the bipolar transistor is fixed to a given level by the clamp means. And, excess storage carriers, for example, within the base of the bipolar transistor are discharged toward its collector side by a diode.

DESCRIPTION OF THE PREFERRED EMBODIMENTS

Embodiments of the present invention will now be described with reference to the drawings.

Figure 1:
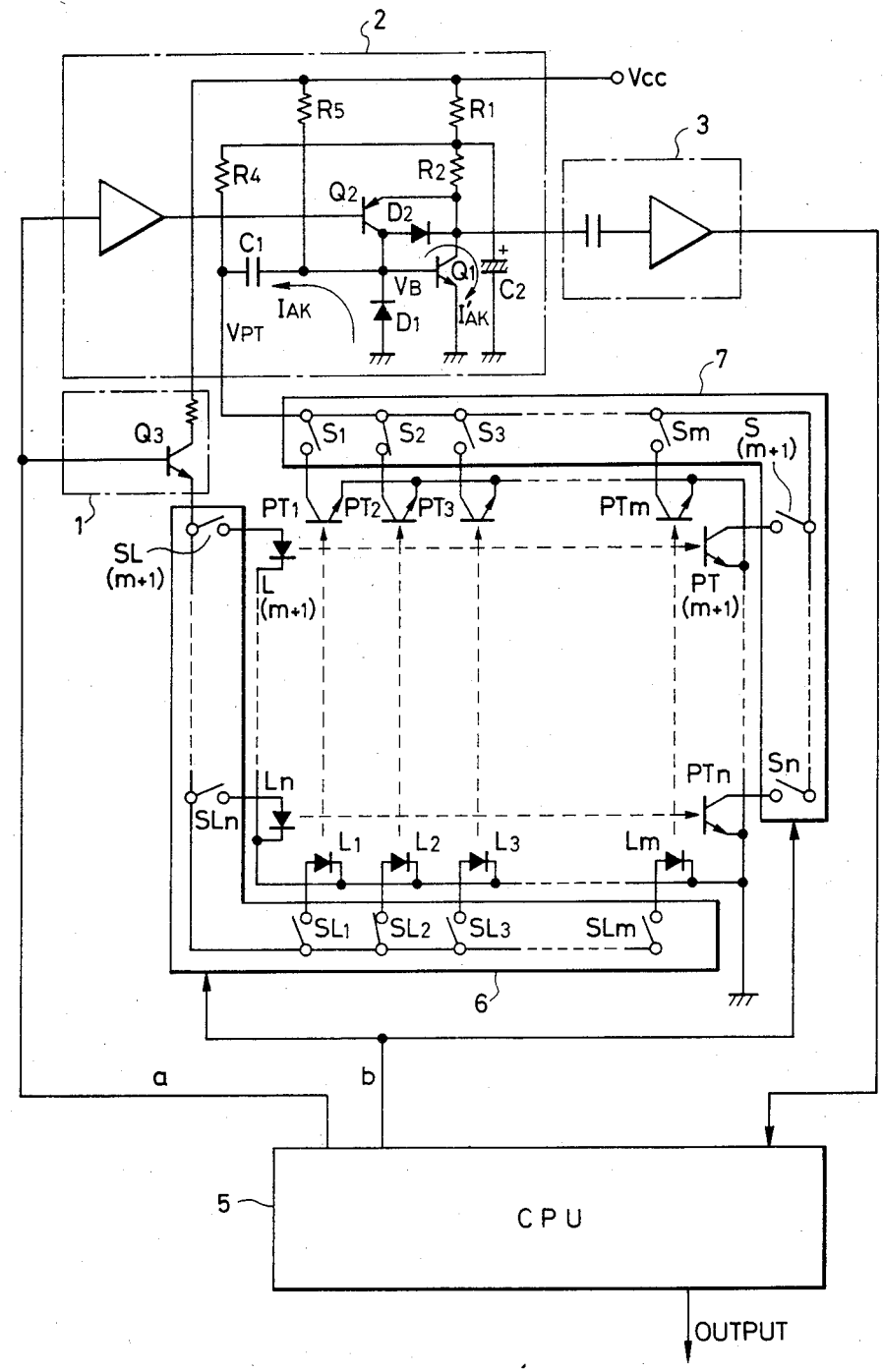
FIG. 1 is a schematic circuit diagram of a first embodiment according to the present invention.
Figure 2:
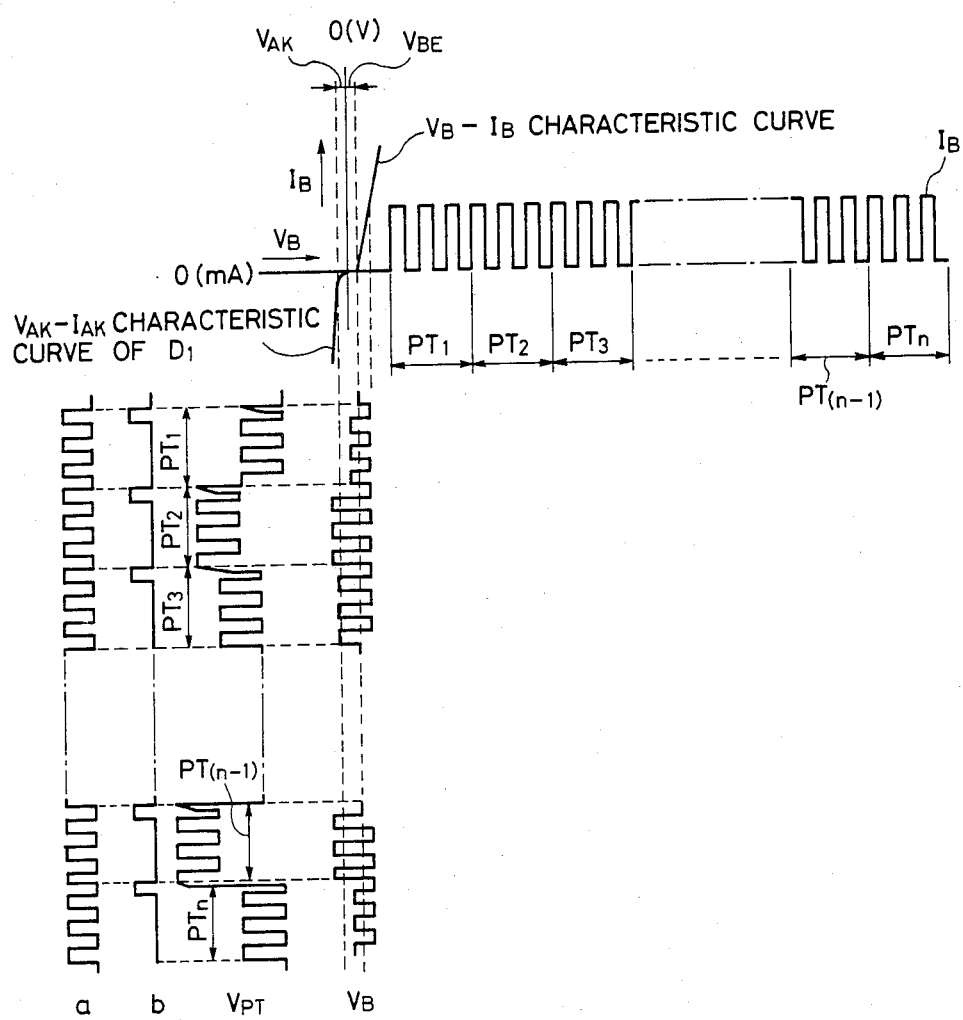
FIG. 2 is a diagram showing signal waveforms at portions of the circuit shown in FIG. 1.
Figure 3:
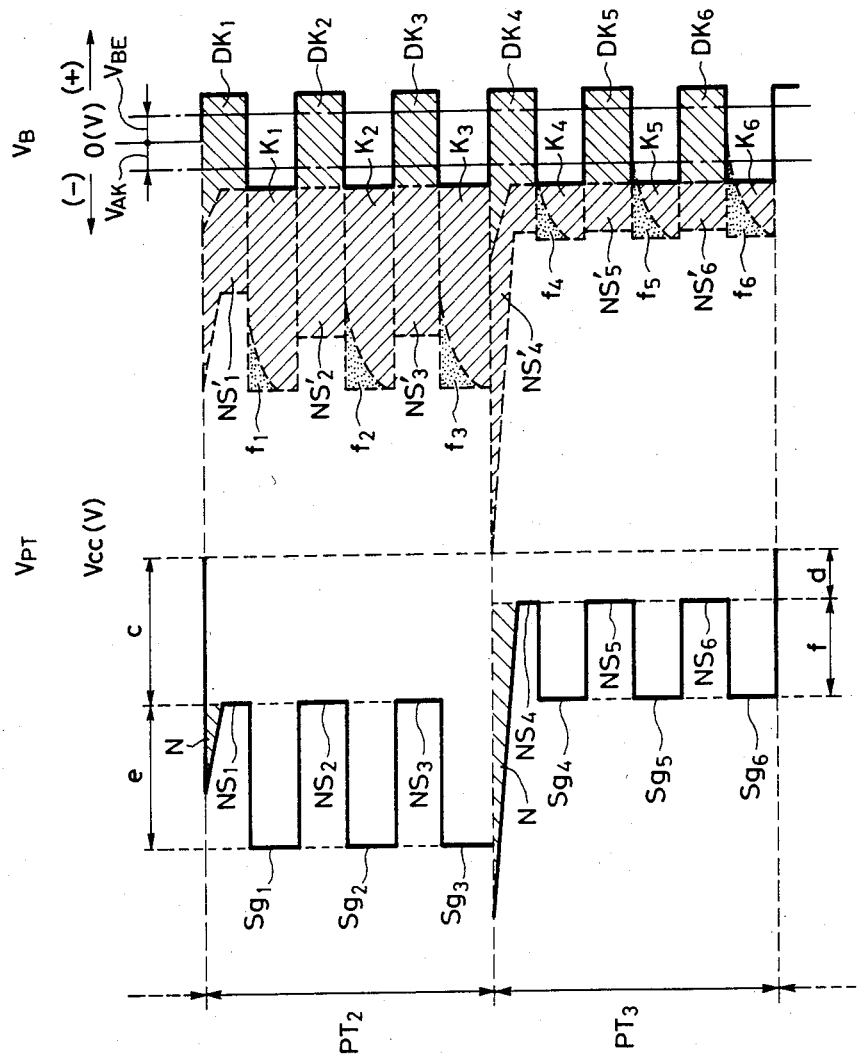
FIG. 3 is a diagram illustrating the action of a waveform shaping circuit shown in FIG. 1.

FIGS. 1 through 3 show the first embodiment of the present invention, in which FIG. 1 is a schematic circuit diagram, FIG. 2 is a waveform diagram, FIG. 3 is an explanation diagram illustrating the action of a waveform shaping circuit for compensating for the waveform of the output signal of light receiving elements, and portions identical to those of the conventional configuration are indicated by the same reference symbols, and further description thereof is omitted.

Describing first the configuration, in FIG. 1, reference numeral 2 indicates a waveform shaping circuit. To a drive circuit 1 and the waveform shaping circuit 2 a drive signal a is applied, and to a first and second switching circuits 6 and 7 a switching signal b is applied. A pulse current given from the drive circuit 1 is applied to the first switching circuit 6 and caused to flow through light emitting diodes $L_1$-$L_n$ one circuit at a time successively to provide a light pulse signal. The second switching circuit 7 switches successively phototransistors $PT_1$-$PT_n$ corresponding to the light emitting diodes $L_1$-$L_n$ to detect the light pulse signal given from the individual elements of light emitting diodes $L_1$-$L_n$, and supplies the detected output to the waveform shaping circuit 2.

The output of the second switching circuit 7 is connected through a coupling condenser $C_1$ to the base of a transistor $Q_1$ included in the waveform shaping circuit 2. To this base the cathode of a diode $D_1$ is connected with its anode grounded. To the base of the transistor $Q_1$ are connected the anode of a diode $D_2$ and the collector of a transistor $Q_2$, and to the collector of the transistor $Q_1$ are connected the cathode of the diode $D_2$ and the emitter of the transistor $Q_2$. To the base of the transistor $Q_1$ is connected one end of a resistor $R_5$ connected to a power terminal Vcc. The collector of the transistor $Q_2$ is connected through resistors $R_1$ and $R_2$ to the power terminal Vcc. The emitter of the transistor $Q_1$ is grounded. To the base of the transistor $Q_2$ the drive signal a given from a CPU 5 is supplied through an amplifier included in the waveform shaping circuit 2.

To the connection point between the resistors $R_1$ and $R_2$ a condenser $C_2$ is connected for bypassing a fluctuation of an a.c. voltage. The collector of the transistor $Q_1$ functioning as the signal output section of the waveform shaping circuit 2 of the foregoing configuration is connected to an amplifier circuit 3 whose output is connected to the CPU 5.

Describing now the operation, a pulse voltage waveform provided from the second switching circuit 7 is like that indicated by $V_{PT}$ in FIG. 2, as is the case of the conventional configuration, and includes noises due to the photoelectric conversion characteristic of the light emitting and light receiving elements and disturbance light (such as display-, sun-, and illumination-light), as well as switching noises generated when the second switching circuit 7 switches the signals given from the phototransistors $PT_1$-$PT_n$.

An example of the pulse voltage waveform $V_{PT}$ including noises as above will now be described with reference to FIG. 3 in connection with the phototransistors $PT_2$ and $PT_3$. As indicated by $V_{PT}$ in this drawing, the pulse voltage waveform $V_{PT}$ includes a voltage difference caused by variations in the amount of disturbance light and variations in the light receiving characteristic of the phototransistors $PT_2$ and $PT_3$, corresponding to the difference between c and d, and a voltage difference arising due to variations in the light emitting characteristic of the light emitting diodes $L_2$ and $L_3$ and variations in the light receiving characteristic of the phototransistors $PT_2$ and $PT_3$, corresponding to the difference between e and f, and a shaded waveform portion N includes switching noises generated when the second switching circuit 7 switches the phototransistors $PT_2$ and $PT_3$. All the signals given from the phototransistors $PT_1$-$PT_n$ include these voltage differences and switching noises which are output at different levels.

The pulse voltage waveform $V_{PT}$ including these voltage differences and switching noises is shaped into the form of a base voltage waveform $V_B$ shown in FIGS. 2 and 3 by the action hereinafter described of individual components of the waveform shaping circuit 2.

When the phototransistors $PT_2$ among the phototransistors $PT_1$-$PT_n$ is selected as the light receiving element by the second switching circuit 7, the voltage indicated by $NS_1$ in $V_{PT}$ of FIG. 3, including the level c corresponding to disturbance light and the switching noises N, is detected. This selected voltage is applied through the condenser $C_1$ to the base of the transistor $Q_1$ of the waveform shaping circuit 2. A potential difference is generated so that a base bias voltage applied from the power terminal Vcc through the resistor $R_5$ to the base of the transistor $Q_1$ is biased in the minus direction. Thus, by this potential difference a clamp current $I_{AK}$ is caused to flow through the diode $D_1$ in the direction indicated by $I_{AK}$ in FIG. 1. The conduction loop of the clamp current $I_{AK}$ is formed from the condenser $C_1$, through the switching element $S_2$ selected and closed by the second switching circuit 7, the collector-emitter grounded of the phototransistor $PT_2$, and the anode-cathode of the diode $D_1$ grounded, to the other electrode of the condenser $C_1$. By this clamp current $I_{AK}$, the potential difference applied through the condenser $C_1$ is compensated for with respect to the shaded voltage portion indicated by $NS_1'$ in $V_B$ of FIG. 3.

This compensated potential difference is the sum of the forward Zener voltage $V_{AK}$ ($\approx 0.6$ V) of the diode $D_1$, the voltage divided by one switching element $S_2$ of the second switching circuit 7, and the voltage divided between emitter and collector of one element $PT_2$ out of the phototransistors $PT_1$-$PT_n$, and the difference appears depending upon the value of the clamp current $I_{AK}$.

However, this voltage compensated by the clamp current $I_{AK}$ cannot cause the base circuit $I_B$ to flow through the transistor $Q_1$. Therefore, this compensated voltage is compensated further by a voltage supplied from the transistor $Q_2$ on the basis of the drive signal a. That is, at this moment, the drive signal a is at a low level, and the voltage is supplied to the base of the transistor $Q_1$ through the emitter-collector of the transistor $Q_2$. By this voltage, the voltage compensated by the clamp current $I_{AK}$ is compensated further with respect to a shaded portion indicated by $DK_1$ in $V_B$ of FIG. 3, so that it is raised up to a voltage level indicated by the solid line, thereby putting the transistor $Q_1$ in the conducting state. As a result, the collector voltage of the transistor $Q_1$ assumes a low level. Consequently, the voltage waveform indicated by $NS_1$ in $V_{PT}$ of FIG. 3 is changed into the low-level signal from which the portions of disturbance light C and switching noises N have been eliminated, and is supplied to the CPU 5. This compensation action of the waveform shaping circuit 2 is effective also with respect to portions indicated by $NS_2$-$NS_6$ in $V_{PT}$ of FIG. 3 which are light receipt signals provided when the light emitting diodes $L_2$ and $L_3$ are not emitting light, and they are compensated for as indicated by $DK_2$-$DK_6$ in $V_B$ of FIG. 3.

However, because the current supplied from the transistor $Q_2$ is limited to a certain amount thereby limiting the base current $I_B$ of the transistor $Q_1$, the amount of each shaded portion indicated by $DK_1$-$DK_6$ in $V_B$ of FIG. 3 to be compensated for by that current varies from portion to portion depending upon the presence/absence of the action of switching noises. The base current $I_B$ involving variations causes a variation in the amount of excess storage carriers accumulated within the base of the transistor $Q_1$. As a result, a variation appears in an input waveform causing the collector voltage input to the transistor $Q_1$ to assume a high level, as indicated by $f_1$ and $f_4$ in $V_B$ resulting when switching noises have occurred and $f_2$, $f_3$, $f_5$, and $f_6$ in $V_B$ of FIG. 3 resulting when no switching noise has occurred.

Therefor, the amount of excess storage carriers is regulated to a certain value by the diverting action of the diode $D_2$ connected across the base-emitter of the transistor $Q_1$. That is, by the diverting action, a part of the base current $I_B$ of the transistor $Q_1$ flows through the diode $D_2$ and from the collector to emitter of the transistor $Q_1$ (see $I'_{AK}$ in FIG. 1).

Therefore, the base current $I_B$ of the transistor $Q_1$ is caused to flow by a voltage which is a smaller difference between the base voltage $V_B$ and either the base-emitter forward Zener voltage ($V_{BE} \approx 0.6$ V) of the transistor $Q_1$ or the sum of the anode-cathode forward Zener voltage ($V_{AK} \approx 0.6$ V) of the diode $D_2$ and the voltage divided between collector and emitter of the transistor $Q_1$. The variation of the base current $I_B$ is caused substantially by the voltage variation (0.03 V–0.12 V) to be divided between collector and emitter of the transistor $Q_1$, and the value of the collector voltage fluctuating due to the above is negligible.

The light pulse provided when one element $L_2$ out of the light emitting diodes $L_1$-$L_n$ emits light is received by one opposed element $PT_2$ out of the phototransistors $PT_1$-$PT_n$, thereby resulting in the pulse voltage waveform $V_{PT}$ as indicated by $S_{q1}$ in FIG. 3. This pulse voltage waveform $S_{q1}$ has the composed value of the portion c biased largely toward the minus side by disturbance light and the portion e biased toward the minus side by the light given from the light emitting diode $L_2$. This voltage is applied through the condenser $C_1$ to the base of the transistor $Q_1$ to counteract the excess storage carriers accumulated within the base of the transistor $Q_1$ and lower the base voltage $V_B$. By this applied voltage the clamp current $I_{AK}$ flows in the direction indicated by $I_{AK}$ in FIG. 1 depending upon the potential difference across the electrodes of the condenser $C_1$. As described hereinabove, the clamp current $I_{AK}$ compensates for the shaded portion indicated by $DK_1$ in $V_B$ of FIG. 3 to clamp the base voltage $V_B$ to a certain voltage level illustrated by the solid line. At this moment, the drive signal a is at a high level and a voltage is not applied from the transistor $Q_2$ to the base of the transistor $Q_1$. Accordingly, the base voltage $V_B$ is lower than the base-emitter forward Zener voltage $V_{BE}$ of the transistor $Q_1$; thus, the base current $I_B$ does not flow and the collector voltage is at a high level.

The foregoing operation is effective equally with respect to $S_{q2}$-$S_{q6}$ shown in FIG. 3. By the clamp current $I_{AK}$ the shaded portions indicated by $K_2$-$K_6$ in $V_B$ of FIG. 3 are compensated so that the base voltage $V_B$ is clamped to a certain voltage level indicated by the solid line, and the output of the waveform shaping circuit 2 is provided from the collector of the transistor $Q_1$ in the form of a pulse signal of certain level.

The foregoing operation of the waveform shaping circuit 2 takes place with respect to all the phototransistors $PT_1$-$PT_n$, and the output signal of the waveform shaping circuit 2 is applied through the amplifier circuit 3 to the CPU 5 where it is subjected to a coordinate signal conversion process, whereby there is provided the position information.

As a modification of the first embodiment, the number of light pulses provided from one light emitting element may be changed from three to one. Even in this case of modification, by deleting noise components between the emitted light pulses on the basis of the drive signal for causing generation of the light pulses and by regulating the voltage value of the detected signal to a certain level, it is possible to effect correct conversion into the coordinate signal and increase the rate of detection per unit time even when strong disturbance light is detected.

Figure 4:
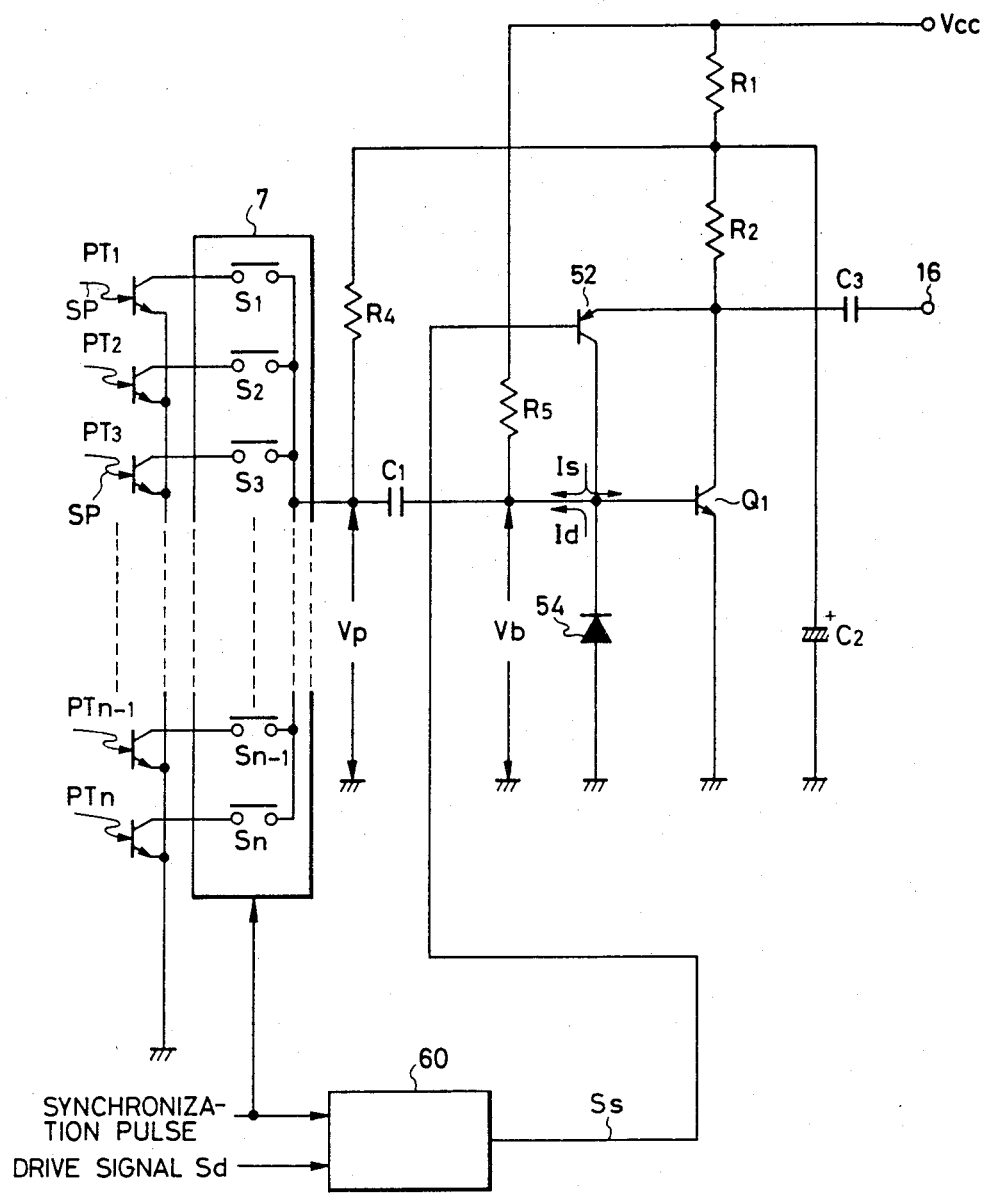
FIG. 4 is a schematic circuit diagram of a second embodiment according to the present invention.
Figure 5:
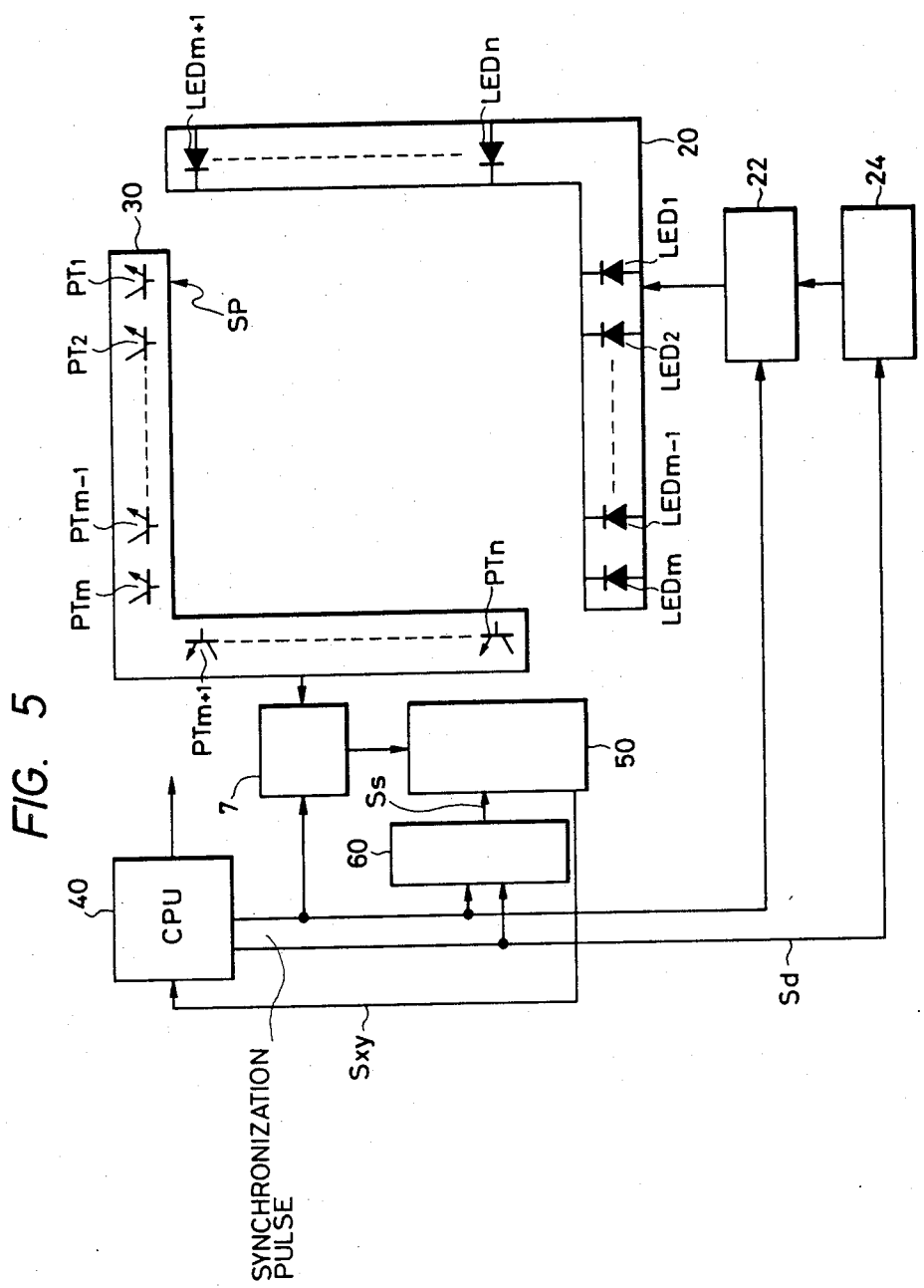
FIG. 5 is a diagram showing the whole circuit configuration of the second embodiment.
Figure 6:
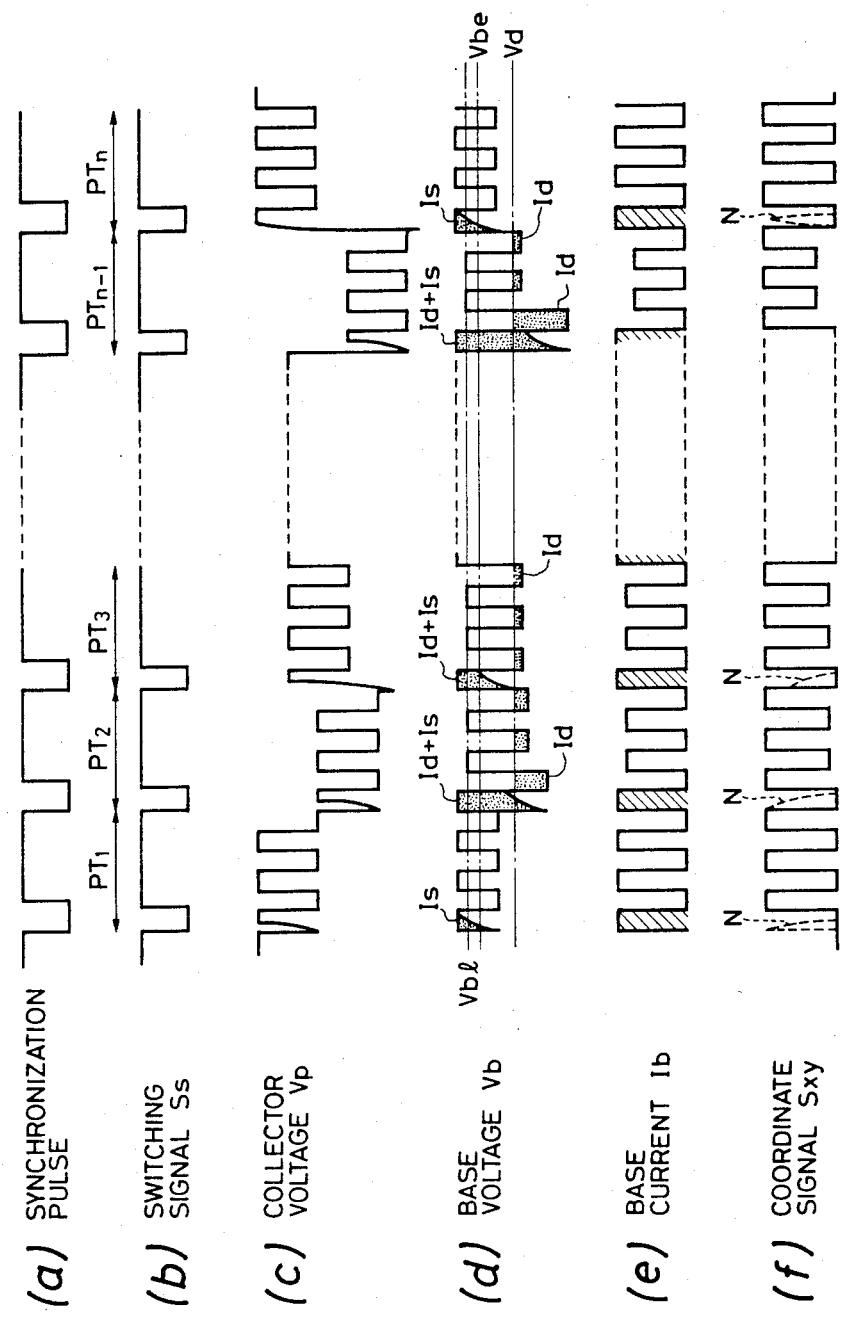
FIG. 6 is a diagram showing signal waveforms at portions of the circuit shown in FIG. 4.

FIGS. 4 through 6 show the second embodiment of the present invention, in which FIG. 5 shows the whole configuration. The coordinate input device illustrated comprises a light emitting element array 20 and a light receiving element array 30. The light emitting element array 20 is composed of a plurality of $LED_1$-$LED_n$ and disposed in front of the screen of a CRT display not shown in the form of a letter L. The light receiving element array 30 is composed of a plurality of phototransistors $PT_1$-$PT_n$ disposed on the opposite side, opposite to the $LED_1$-$LED_n$, respectively, in front of the screen and arranged in the form of a letter L. The anode side each of the $LED_1$-$LED_n$ is connected to the corresponding switch of a switching circuit 22, and to this switching circuit 22 a drive circuit 24 is connected. To the drive circuit 24 a drive signal Sd is supplied from a CPU 40.

The phototransistors $PT_1$-$PT_n$ are connected through the switching circuit 7 to an amplifier 50. That is, the emitters of the phototransistors $PT_1$-$PT_n$ are grounded in common, as shown in FIG. 4, and their individual collectors are connected to the respective switches $S_1$-$S_n$ of the switching circuit 7. The individual switches $S_1$-$S_n$ are connected through the coupling condenser $C_1$ to the base of the NPN transistor $Q_1$. To the collector of the transistor $Q_1$ a power source Vcc is connected through the resistors $R_1$ and $R_2$. To the collector of the transistor $Q_1$ an output terminal 16 is also connected through a coupling condenser $C_3$. A coordinate signal Sxy described hereinafter, provided from the output terminal 16 is applied to the CPU 40, as shown in FIG. 5. To the base of the transistor $Q_1$ the power source Vcc is connected through the base resistor $R_5$. The resistor $R_4$ is connected to the point between the resistors $R_1$ and $R_2$ for applying a voltage through the switching circuit 7 to the phototransistors $PT_1$-$PT_n$, and the condenser $C_2$ is also connected to the same point for bypassing a fluctuation of the power source Vcc.

To the collector and base of the transistor $Q_1$ are connected respectively the emitter and collector of a PNP transistor 52 serving as a switching means, and to the base of the PNP transistor 52 a pulse processing circuit 60 is connected. To this pulse processing circuit 60 the drive signal Sd provided from the CPU 40 is applied. Because at the time of inputting of a synchronization pulse also provided from the CPU 40 the drive signal Sd assumes an "L" level, this drive signal Sd is supplied as a switching signal Ss to the base of the PNP transistor 52. To the base of the transistor $Q_1$ the cathode side of a diode 54 is also connected. The anode side of this diode 54 is grounded, thereby forming a lower-end clamp circuit in conjunction with the coupling condenser $C_1$.

The operation of this second embodiment will now described with reference to the waveform diagram of FIG. 6.

As the synchronization pulse (see FIG. 6(a)) given from the CPU 40 is applied to the switching circuits 7 and 22, the switch $S_1$ of the switching circuit 7 and the switch corresponding to the $LED_1$ of the switching circuit 22 are closed and the collector voltage Vp of the phototransistor $PT_1$ falls momentarily due to switching noises, as shown in FIG. 6(c). On the other hand, when the synchronization pulse is applied to the switching circuits, the drive signal Sd is maintained at the "L" level and at the same time, this synchronization pulse is applied also to the pulse processing circuit 60. As a result, only during the time interval from the falling of the synchronization pulse to the rising of the drive signal Sd, the drive signal Sd of "L" level is supplied, as the switching signal Ss, from the pulse processing circuit 60 to the base of the PNP transistor 52. Transistor 52 is switched to the ON state; thus, to the base of the transistor $Q_1$ the voltage is applied through the resistors $R_1$ and $R_2$ and the emitter-collector of the PNP transistor 52, and the current Is flows as shown in FIG. 4. Consequently, the base voltage Vb of the transistor $Q_1$ is maintained at a given value, i.e. a little larger than the base-emitter voltage Vbe ($\approx$0.6 V) of the transistor $Q_1$ and a base bias voltage set by the resistor $R_5$, as shown in FIG. 6(d). As a result, as shown in FIG. 6(e), the base current Ib (the shaded waveform) flows through the transistor $Q_1$ and its collector voltage falls; thus, the noise signal N represented by the broken line in FIG. 6(f) is never added to the coordinate signal.

Then, as the drive signal Sd containing three pulse signals is provided from the CPU 40 and this drive signal is supplied to the drive circuit 24, the $LED_1$ is driven to provide three light signal Sp, so that the phototransistor $PT_1$ receives these light signals and is rendered conductive. That is, the current flows through the resistors $R_1$ and $R_4$, switch $S_1$, and the collector-emitter of the phototransistor $PT_1$, and the collector voltage Vp of the phototransistor $PT_1$ falls successively so as to create pulses. Consequently, three minus pulse voltages (see FIG. 6(d)) are applied through the coupling condenser $C_1$ to the base of the transistor $Q_1$; thus, the base current Ib falls successively so as to create pulses, as shown in FIG. 6(e). Therefore, the collector voltage of the transistor $Q_1$ rises correspondingly and the coordinate signal containing three pulse signals is provided from the output terminal 16. Upon inputting of this coordinate signal, the CPU 40 counts the number of pulses and by obtaining the count identical to a given number "3", decides that there is no entry of the coordinate.

In case the collector voltage Vp of the phototransistor $PT_2$ to be scanned then has been lowered (see FIG. 6(c)) due to its characteristic, disturbance light, etc., as the synchronization pulse is provided from the CPU 40, the collector voltage Vp falls further due to switching noises. In this case, in response to the switching signal Ss given from the pulse processing circuit 60, the PNP transistor 52 is switched to the ON state, so that the current Is flows as described hereinabove. On the other hand, as the level of the collector voltage Vp of the phototransistor $PT_2$ lowers, the cathode side of the diode 54 changes in the minus direction, and the current Is flows as shown in FIG. 4 in correspondence with a voltage part changed in the minus direction in excess of the anode-cathode voltage Vd ($\approx$0.6 V). That is, the diode 54 exerts its clamp action. Consequently, the base voltage Vb of the transistor $Q_1$ is compensated for as shown in FIG. 6(d) by the currents Is and Id and maintained at a given level larger than its base bias voltage. Thus, the base current Ib flows as shown in FIG. 6(e) and the noise signal N is prevented from being included in the coordinate signal.

Following the above, as the pulse signal forming drive signal Sd is provided from the CPU 40 and the $LED_2$ emits light, the phototransistor $PT_2$ is rendered conductive and its collector voltage Vp falls; thus, the base voltage Vb of the transistor $Q_1$ also falls. In this case, because the current Id flows through the diode 54 as shown in FIG. 6(d) by the clamp action and the voltage Vd is compensated for, the falling level of the base voltage Vb is clamped (lower-end clamp). Then, at the moment the pulse signal forming the drive signal Sd falls and the collector voltage Vp of the phototransistor $PT_2$ rises, by the clamp action of the diode 54 this rising voltage is applied through the coupling condenser $C_1$ to the base of the transistor $Q_1$ to raise the base voltage Vb. Accordingly, even when the level of the collector voltage Vp of the phototransistor $PT_2$ is low, the base current is flowing through the transistor $Q_1$, so that the coordinate signal containing three pulse signals is provided from the output terminal 16. Thus, the CPU 40 itself can decide accurately that there is no entry of the coordinate.

Specifically, according to the foregoing configuration and operation of the second embodiment, because the signal waveform (the coordinate signal waveform) of the base voltabe Vb of the transistor $Q_1$ is shaped by the clamp action of the diode 54 and coupling condenser $C_1$, even if the period of the light signal Sp given from the $LED_1$-$LED_n$ is made short and the signal waveform of the collector voltage Vp of the phototransistors $PT_1$-$PT_n$ is distorted, the base current Ib corresponding to the light signal Sp flows surely through the transistor $Q_1$. Thus, the coordinate signal composed of pulse signals corresponding to the light signal Sp is provided from the output terminal 16, and it is possible to detect accurately the presence/absence of entry of the coordinate even when the input device according to the present invention is operated (scanned) at a high speed.

In addition, because the current Is given from the transistor 52 is caused to flow into the base of the transistor $Q_1$, there exist excess storage carriers. Therefore, even if electrical noises infiltrate into the base of the transistor $Q_1$, they can be compensated for by these excess storage carriers. Thus, the coordinate signal can be detected accurately even in the face of electrical noises.

In the foregoing, instead of fhe PNP transistor 52 there can be employed the FET type. In this case, it is possible to operate the input device at a higher speed.

Figure 7:
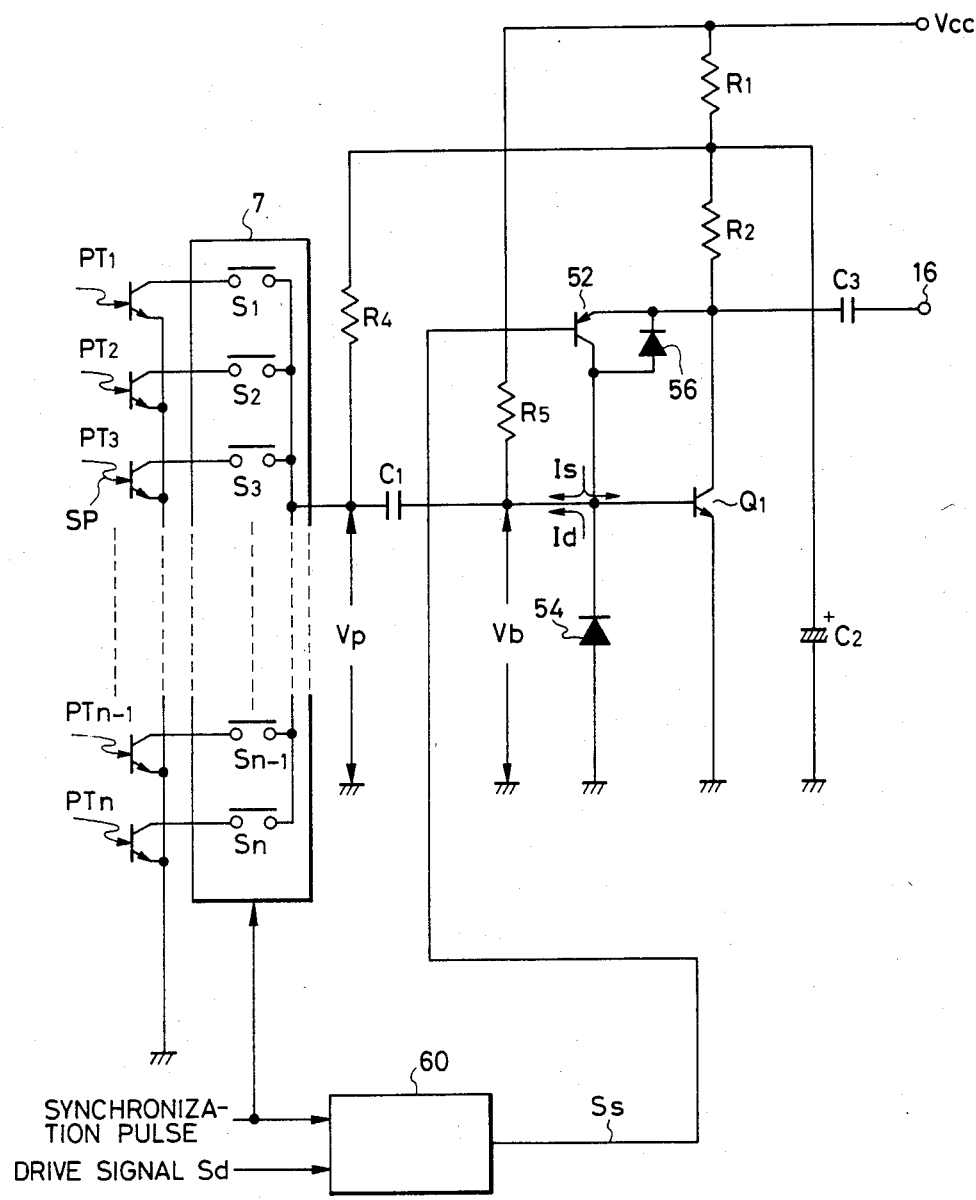
FIG. 7 is a schematic circuit diagram of a third embodiment according to the present invention.
Figure 8:
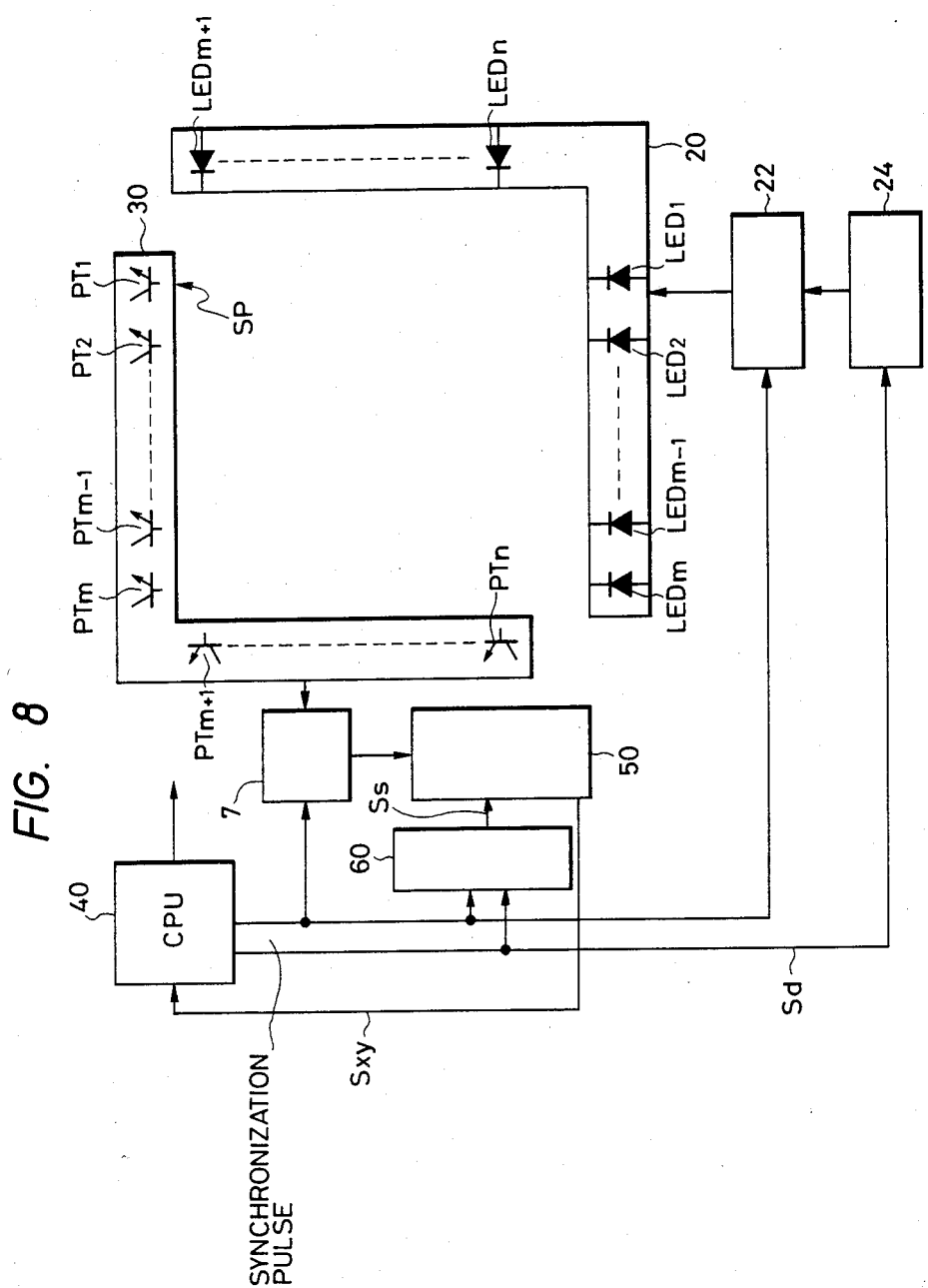
FIG. 8 is a diagram showing the whole circuit configuration of the third embodiment.
Figure 9:
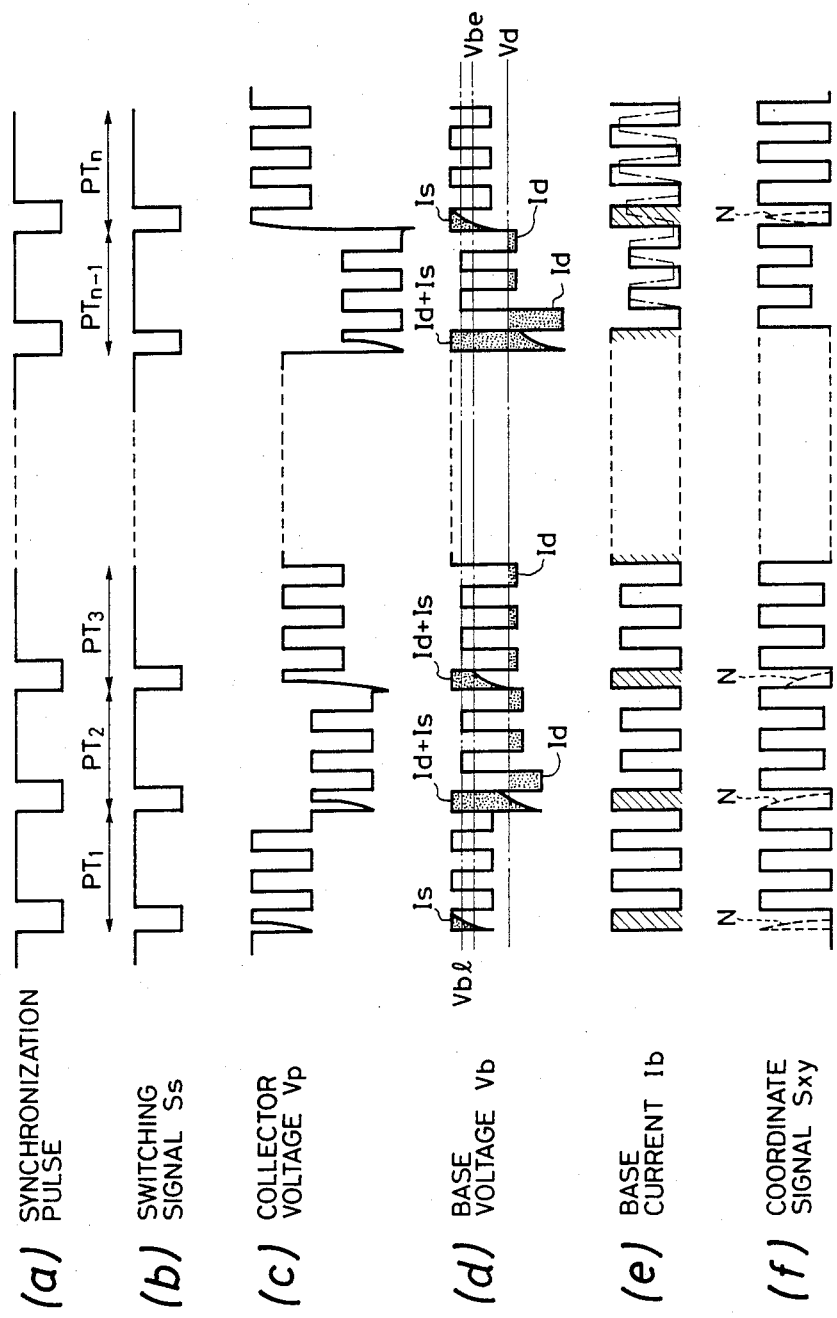
FIG. 9 is a diagram showing signal waveforms at portions of the circuit shown in FIG. 7.
Figure 10:
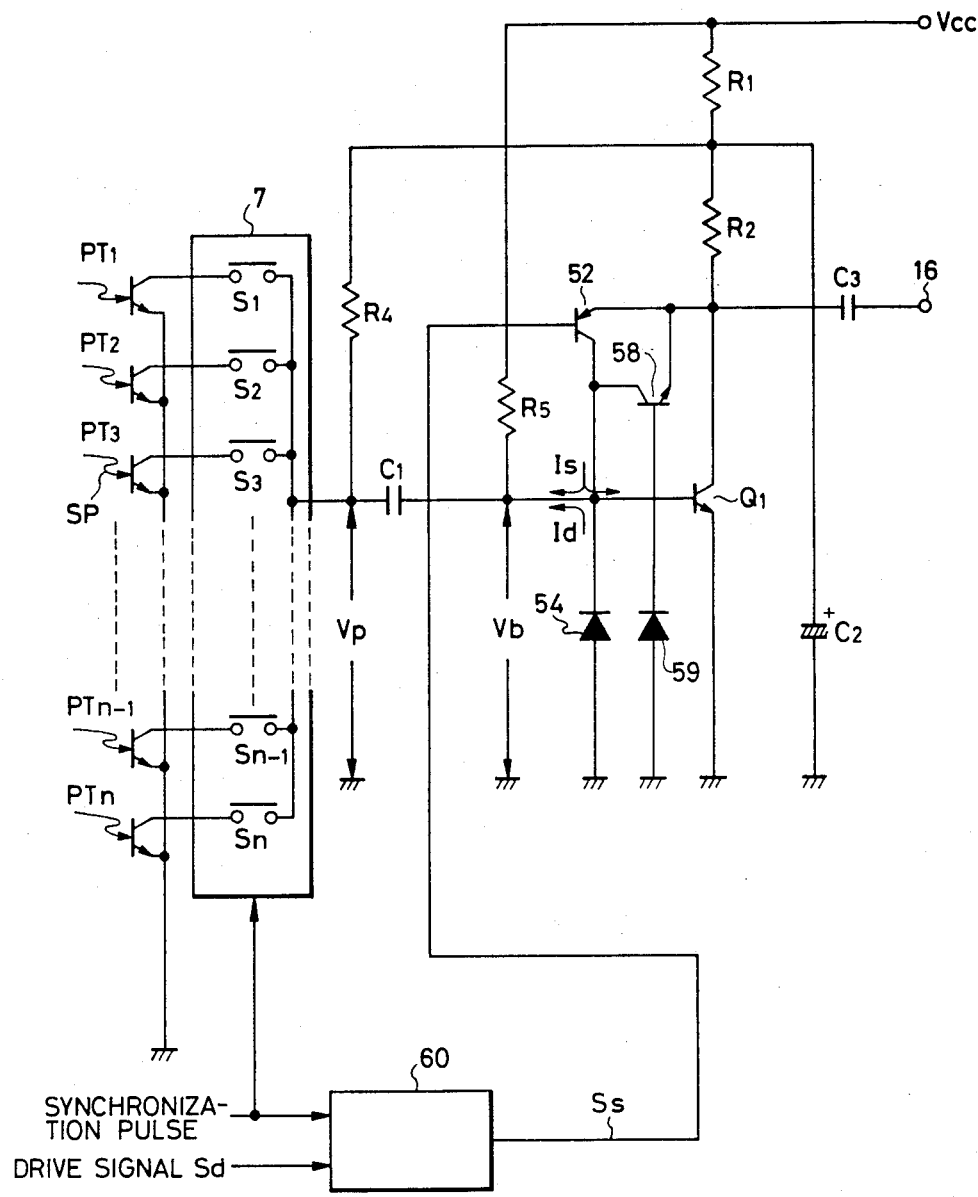
FIG. 10 is a schematic circuit diagram of a modification of the third embodiment.
Figure 11:
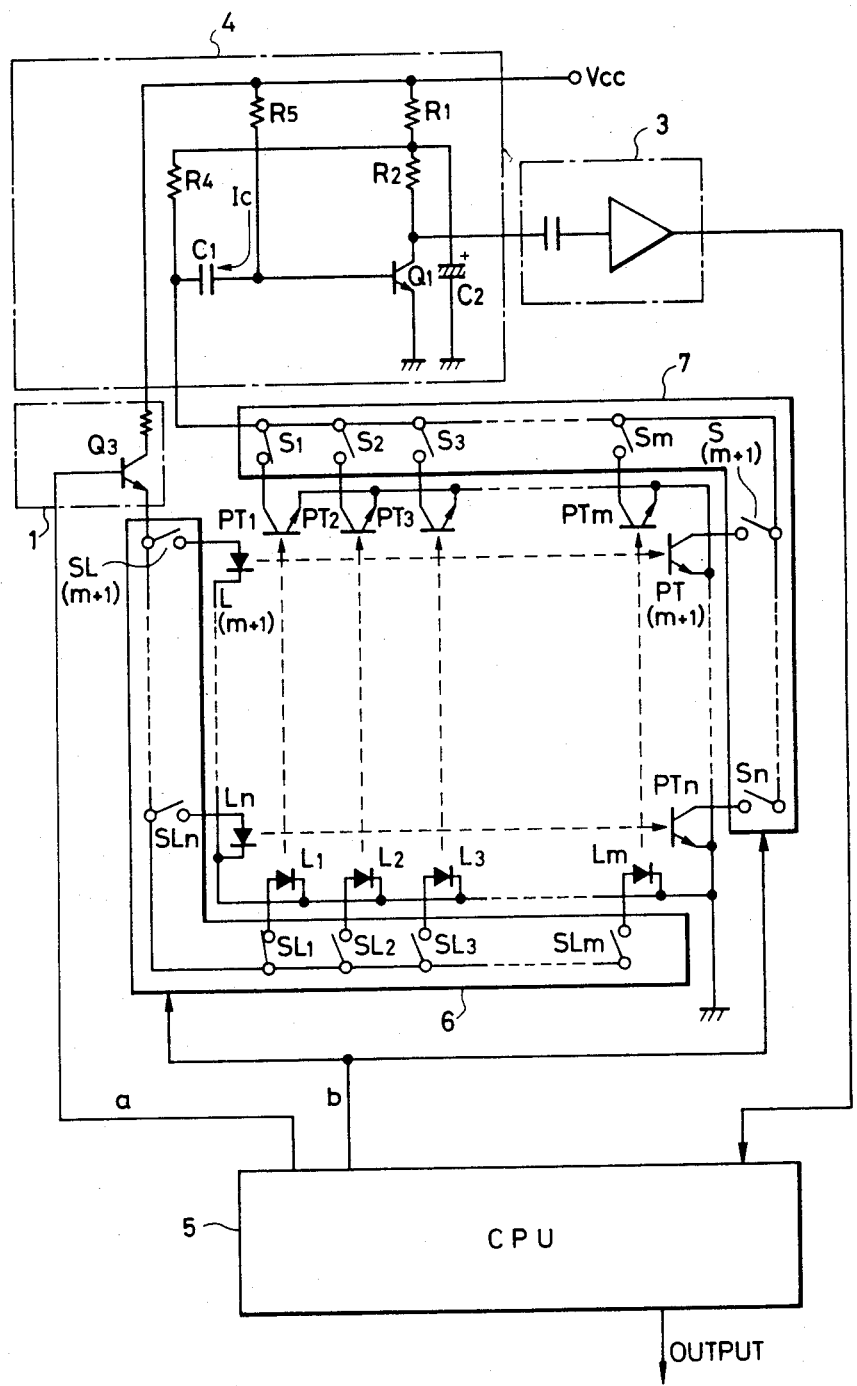
FIG. 11 is a schematic circuit diagram of the conventional optical coordinate input device.
Figure 12:
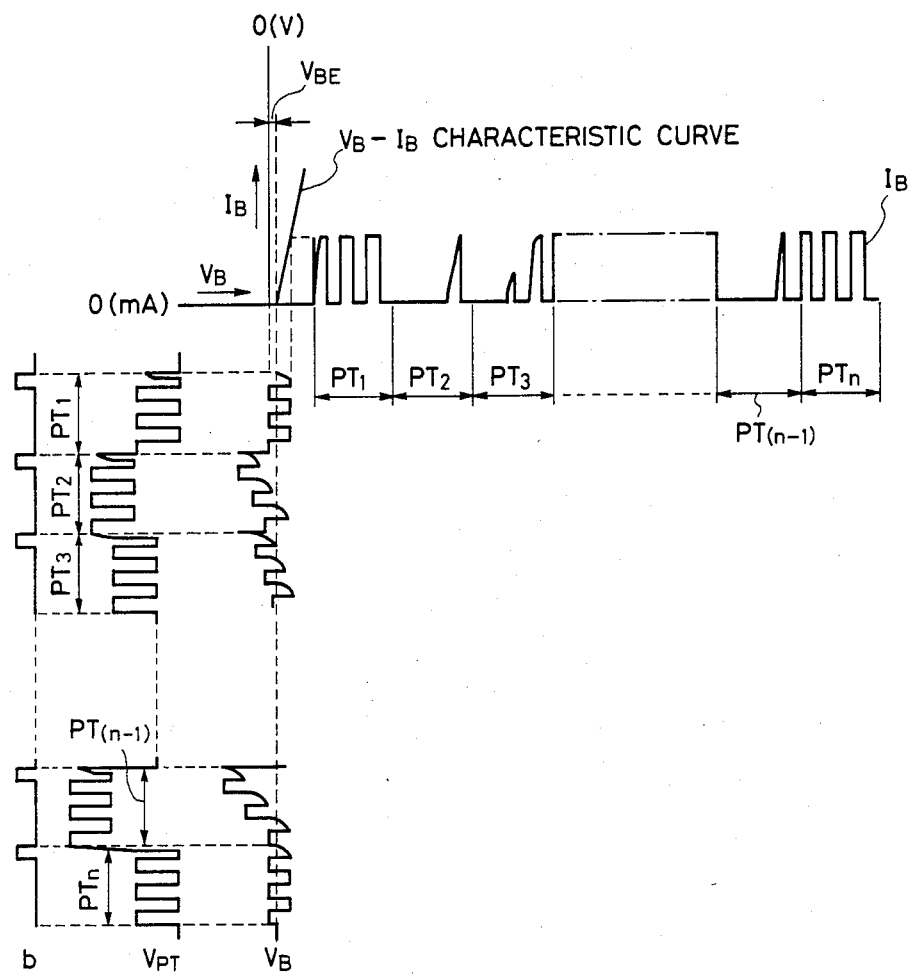
FIG. 12 is a diagram showing signal waveforms at portions of the circuit shown in FIG. 11.

FIGS. 7 through 9 show the third embodiment of the present invention and FIG. 10 shows a modification of this third embodiment, in which FIG. 9 shows the whole configuration. The difference in configuration of this third embodiment from the foregoing second embodiment is that between the base and collector of the transistor $Q_1$ a discharging diode 56 is coupled, as is apparent from comparison between FIG. 7 and FIG. 4.

Because a substantial part of the third embodiment is identical to the second embodiment, only the difference in operation and effect of the third embodiment from the second embodiment will now be described.

According to the configuration of the second embodiment shown in FIGS. 4 through 6, as the base current Ib flows through the transistor $Q_1$, the potential of the base goes up due to the excess storage carriers; thus, the rising and falling of the base current Ib tend to lag as represented by the one-dot chain line in FIG. 9(e). Further, due to the clamp action of the diode 54 the clamp current Id flows into the coupling condenser $C_1$ and there appear variations in the amount of inflow of this current Id; thus, the rising of the base current Ib tends to become unstable further.

On the contrary, according to the configuration of the third embodiment shown in FIGS. 7 through 9, because the diode 56 is coupled across the base-collector of the transistor $Q_1$, an excess part of the clamp current Id into the coupling condenser $C_1$ flows through the diode 56 into the collector of the transistor $Q_1$ and is discharged from the emitter. The excess storage carriers of the base of the transistor $Q_1$ also flow into its collector through the diode 56 and are discharged from the emitter. As a result, the potential of the base with respect to the collector of the transistor $Q_1$ can always be maintained at a certain level; thus, the base current Ib of a given waveform can be obtained and its rising time becomes certain. Therefore, even if the capacitances of the coupling condensers $C_1$ and $C_3$ are set small so that the pulse duration of the light signal Sp is set to 30 sec (normally, 1 msec) and the pulse period is set small, the base current Ib of a given waveform is supplied to the transistor $Q_1$. In the case of clamping the base voltage Vb of the transistor $Q_1$ to a lower end by means of the diode 54 and coupling condenser $C_1$, the base current Ib is surely supplied in correspondence with the light signal Sp to the transistor $Q_1$; thus, even when the input device according to the present invention is operated (scanned) at a high speed, it is possible to detect accurately the presence/absence of entry of the coordinate.

FIG. 10 shows a modification of the third embodiment of the present invention. In the configuration of this modification, instead of the diode 56 there are employed an NPN transistor 58 and Zener diode 59. The collector and emitter of the NPN transistor 58 are connected respectively to the base and collector of the transistor $Q_1$. And, the Zener diode 59 is connected to the base of the NPN transistor 58. Therefore, an excess part of the clamp current Id and the excess storage carriers of the base of the transistor $Q_1$ flow through the NPN transistor 58 into the collector of the transistor $Q_1$, and are discharged from its emitter.

In the foregoing, instead of the PNP transistor 52 there can be employed the FET type. In this case, it is possible to operate the input device at a higher speed.

In the prior art, it was required to sort the phototransistors $PT_1$-$PT_n$ and light emitting diodes $L_1$-$L_n$ in order to reinforce the optical filtering characteristic and enhance the optical conversion characteristic of the optical elements as a countermeasure against disturbance light. In addition, to improve the coordinate detection performance a large current was caused to flow through the light emitting diodes $L_1$-$L_n$ to increase the strength of light emission.

However, according to the present invention, on the basis of the drive signal a causing the light emitting diodes $L_1$-$L_n$ to turn on/off thereby to send out the light pulse signal, a voltage fluctuation of the light receipt signal $V_{PT}$ due to switching noises generated by the second switching circuit 7 and disturbance light is deleted, and its voltage value is regulated to a certain level; thus, the countermeasure of the prior art is not required in the present invention, so that not only the mass productivity of the present device can be enhanced, but also the supply amount of electric current to the light emitting diodes $L_1$-$L_n$ can be reduced. Therefore, the amount of heating inside the device becomes small, and the present device can operate stably without being influenced by strong disturbance light such as the sunlight even if it is miniaturized.

According to the second embodiment of the present invention, at the time of switchover of the switching circuit for connecting the base of the bipolar transistor with the light receiving element array, a given voltage is applied to that base by the switching means, and the level of the coordinate signal to be applied to the base of the bipolar transistor is fixed to a given level by the clamp means; thus, the noise signal caused by switching noises arising at the time of switchover of the switching circuit is not included in the coordinate signal. Even if the level at which the light receiving element receives the light signal fluctuates due to an influence, for example, of disturbance light, the level of the coordinate signal to be supplied to the base of the bipolar transistor is maintained substantially constant. In addition, it is also possible to compensate for electrical noises infiltrating into the base by the excess storage carriers of the base of the bipolar transistor. Therefore, the present invention can provide the optical coordinate input device capable of sending out the coordinate signal accurately to the personal computer and the like.

Further, according to the third embodiment of the present invention, at the time of switchover of the switching circuit for connecting the base of the bipolar transistor with the light receiving element array, a given voltage is applied to that base by the switching means, the level of the coordinate signal to be applied to the base of the bipolar transistor is fixed to a given level by the clamp means. The potential of the base with respect to the collector of the bipolar transistor is maintained constant by the discharging action of the diode; thus, the noise signal caused by switching noises arising at the time of switchover of the switching circuit is not included in the coordinate signal. Even if the level at which the light receiving element receives the light signal fluctuates due to an influence, for example, of disturbance light, the base current of a given waveform is surely applied as the coordinate signal to the base of the bipolar transistor. Therefore, the present invention can provide the optical coordinate input device capable of sending out the coordinate signal accurately and at a high speed to the personal computer and the like.

What is claimed is:

1. An optical coordinate input device comprising:
  a plurality of light emitting elements arranged so that their optical axes are in parallel,
  a plurality of light receiving elements arranged so as to receive light signals emitted from said light emitting elements,
  a drive circuit for turning on/off said light emitting elements on the basis of a drive signal to cause them to provide the light signals,
  a first switching circuit for switching the drive signal given from said drive circuit successively to said light emitting elements, wherein each corresponding one of said light receiving elements provides a reception signal upon receipt of a light signal from a respective one of said light emitting elements if the light signal is not blocked by an interposed object,
  a second switching circuit for switching the reception signals given from said light receiving elements successively to an output circuit in correspondence with the driving of said light emitting elements, and
  a waveform shaping circuit having AC coupling means connected between said second switching circuit and said output circuit for removing DC fluctuations from the output reception signals given from said second switching circuit and dynamically clamping said signals to a predetermined voltage level, said AC coupling means including means for receiving said drive signal so as to perform said removing and clamping function in response to the drive signal.

2. An optical coordinate input device according to claim 1, wherein said waveform shaping circuit switches and regulates the signal given from said second switching circuit to a certain voltage level in synchronization with the drive signal.

3. An optical coordinate input device according to claim 1, wherein said light emitting elements are light emitting diodes and said light receiving elements are phototransistors.

4. An optical coordinate input device according to claim 2, wherein said waveform shaping circuit includes switching means ($Q_2$, 52) responsive to the drive signal (a), and clamp means ($D_1$, 54) for causing flowing of a clamp current ($I_{AK}$).

5. An optical coordinate input device according to claim 4, wherein said waveform shaping circuit includes further adjusting means ($D_2$, 56) exerting its diverting action.

6. An optical coordinate input device comprising
an array of light receiving elements arranged opposite to another array of light emitting elements for receiving the light signal given from each light emitting element to provide a coordinate signal,
a switching circuit for switching and connecting said light receiving element array in correspondence with scanning of the light emitting elements,
a bipolar transistor whose base is connected through said switching circuit to said each light receiving element for amplifying and providing the coordinate signal, and
a coupling condenser for coupling said switching circuit with the base of said bipolar transistor, charcterized by
switching means being closed at the time of switch-over of said switching circuit for applying a given voltage to the base of said bipolar transistor, and
clamp means for fixing the coordinate signal to be applied to the base of said bipolar transistor to a given level.

7. An optical coordinate input device according to claim 6, characterized further by
adjusting means for adjusting the base current of said bipolar transistor.

8. An optical coordinate input device according to claim 7, wherein said adjusting means is a diode ($D_2$, 56) connected between the base and collector of said bipolar transistor.

9. An optical coordinate input device according to claim 7, wherein said adjusting means is composed of a second transistor (58) connected between the base and collector of said bipolar transistor and a diode (59) connected to the base of said second transistor.

10. An optical coordinate input device according to claim 6, wherein said switching means is a transistor ($Q_2$, 52) and said clamp means is a diode ($D_1$, 54).

* * * * *